Sept. 11, 1962 A. W. MORLEY 3,053,324
GAS TURBINE POWER UNITS FOR HELICOPTERS
Filed July 28, 1958 5 Sheets-Sheet 1

INVENTOR
ARNOLD W. MOBLEY

BY Watson, Cole, Grindle & Watson
ATTORNEY

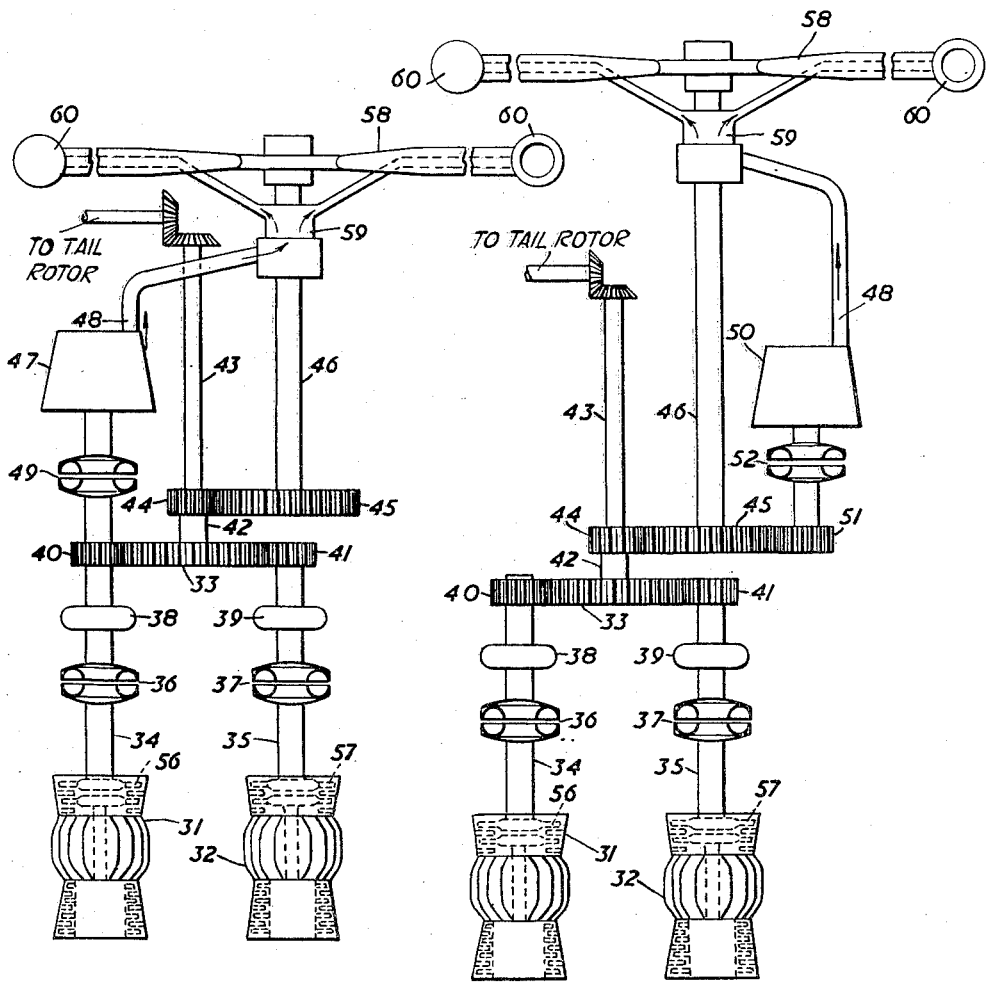

Sept. 11, 1962   A. W. MORLEY   3,053,324
GAS TURBINE POWER UNITS FOR HELICOPTERS
Filed July 28, 1958   5 Sheets-Sheet 4

INVENTOR
ARNOLD W. MORLEY

BY Watson, Cole, Grindle & Watson
ATTORNEY

United States Patent Office 3,053,324
Patented Sept. 11, 1962

3,053,324
GAS TURBINE POWER UNITS FOR HELICOPTERS
Arnold W. Morley, Ruislip, England, assignor to D. Napier & Son Limited, London, England, a company of Great Britain
July 28, 1958, Ser. No. 751,503
Claims priority, application Great Britain, Aug. 7, 1957
9 Claims. (Cl. 170—135.4)

This invention relates to gas turbine helicopter power units having an air compressor supplying air to a combustion chamber, which in turn supplies hot gas to drive a turbine which is coupled to and drives the compressor. The rotor of the helicopter may be driven either by the turbine which drives the compressor or by a free turbine which is also driven by the hot gases from the combustion chamber. The invention is applicable to both arrangements but reference will be made to a compressor-driving turbine and a power turbine and it is to be understood that in the case of the former arrangement these turbines will, in fact, be one and the same part.

In certain circumstances it may be necessary to impart from an engine power to the helicopter rotor which is substantially in excess of the normal power supplied by that engine. One such circumstance is in the case of a multi-engine helicopter where provision has to be made for increasing the power delivered from the good engine or engines in the event of failure of an engine. Although it is in general possible to increase the power output of a gas turbine engine temporarily, by introducing excess fuel this extra output is imposed as an increased load on the power turbine itself, on the reduction gearbox of the engine, on the couplings, and in some cases on the rotor gearbox and on the rotor head. Moreover, in such cases an increased torque reaction is imposed on the airframe which may cause instability in flight.

According to the present invention a helicopter power unit of the kind specified includes means driven by the compressor-driving turbine adapted to produce additional compressed air, and means by-passing the power turbine for delivering this additional compressed air to and through the rotor blades for discharge as propulsive jets at or near the blade tips.

In order to take full advantage of the invention the rotor blades may be provided with tip combustion chambers in which fuel can be burnt in the air passing through these chambers. This significantly increases the power output obtainable from the additional air without imposing any additional load on the power unit.

In one form of the invention the means adapted to produce additional compressed air is at least a part of the said air compressor, a tapping being provided for bleeding off this additional air at a point upstream of the power turbine. Conveniently, the tapping is taken at some intermediate point in the compressor, for example at a point where the pressure is of the order of 2 to 3 times atmospheric pressure. This additional air will not pass through the compressor-driving turbine, the speed of which is maintained substantially constant when the tapping is opened by increasing the fuel supply to the combustion chambers of the engine.

In another form of the invention the means for producing additional air is an auxiliary air compressor. This may be permanently coupled to the turbine which drives the main compressor, in which case in ordinary operation either the flow of air through it would be shut off wholly or partly so that it would absorb relatively little power, or it would be delivered to the helicopter rotor for discharge at or near the blade tips at all times but fuel burnt in the air only when additional power is needed. Alternatively the auxiliary air compressor could be brought into operation only when needed, by coupling it to a turbine of the power unit.

The invention is more particularly, but not exclusively, applicable to a helicopter power unit which constitutes one power unit of a multi-engine helicopter and which is so arranged that the means adapted to produce additional air is inoperative for this purpose during normal operation but is brought into operation automatically on failure of another power unit.

Thus in one form of the invention in which the power unit comprises a plurality of engines each having a power turbine coupled through a freewheel device (uni-directional clutch) to reduction gearing providing a common drive to a single helicopter rotor, the auxiliary compressor can be coupled to the said gearing. If the auxiliary compressor is so disposed that it can be coupled directly to the power output shaft of one of the engines, no step-up gearing for the auxiliary compressor is necessary if the power turbine is of the free turbine type.

In another form of the invention which obviates the possible disadvantage, of a good engine driving the auxiliary compressor through transmission which includes a pinion on the free turbine shaft of a failed engine, the auxiliary compressor is so disposed that it can be coupled through speed-increasing or step-up gearing to an output shaft of the said reduction gearing. The step-up gearing is necessary because the auxiliary compressor is required to rotate at a higher speed that the helicopter rotor driven by the said output shaft.

In a further form of multi-engine helicopter embodying the invention, the power turbines of these engines drive individual helicopter rotors through individual freewheel devices, the power turbines are coupled together through gearing disposed between the free wheel devices and the helicopter rotors so that all these rotors will continue to receive a drive in the event of failure of an engine, and the auxiliary compressor is coupled to the said gearing so that it too can be driven in the event of failure of any of the engines.

An advantage of the invention is that the rotor power can be increased without imposing any more load on the rotor drive and by burning fuel in the air discharged from the rotor tips a further increase can be obtained without further increasing the load on the power unit. Augmentation of power by tip jets is particularly advantageous for hovering flight, where a high power is required for relatively short periods with the least additional weight. Since the need to safeguard against engine failure is likely to be more urgent when the aircraft is hovering, the invention provides a device for obtaining emergency power more suitable than one depending entirely on a mechanical drive. For normal cruising flight, power is still provided solely by a mechanical drive.

A further advantage is that since the emergency power system does not increase the torque reaction on the helicopter airframe there is the least possible disturbance to the stability of the helicopter when the emergency power system is being brought into operation.

Furthermore, the power turbine itself and the mechanical drive therefrom do not have to be designed more strongly and heavily than is necessary for their ordinary function, and since the emergency power system does not overload the power turbine or the mechanical drive these parts will not suffer reduced life by the emergency power system being brought into operation. Moreover, due to the high efficiency under hovering conditions when this type of rotor drive is employed, as compared to a mechanical drive, the turbine inlet temperature for a given set rotor power output will be somewhat lower than a mechanical emergency power system.

The invention may be performed in various ways, and certain embodiments thereof will now be described by way of example with reference to the accompanying diagrammatic drawings, in which:

FIGURE 1 is an elevation of one form of helicopter power unit embodying the invention, in which the main compressor is also the source of additional compressed air;

FIGURES 2 to 4 inclusive show three different forms of multi-engine power unit for driving a single helicopter rotor and having an auxiliary compressor;

Figure 1:
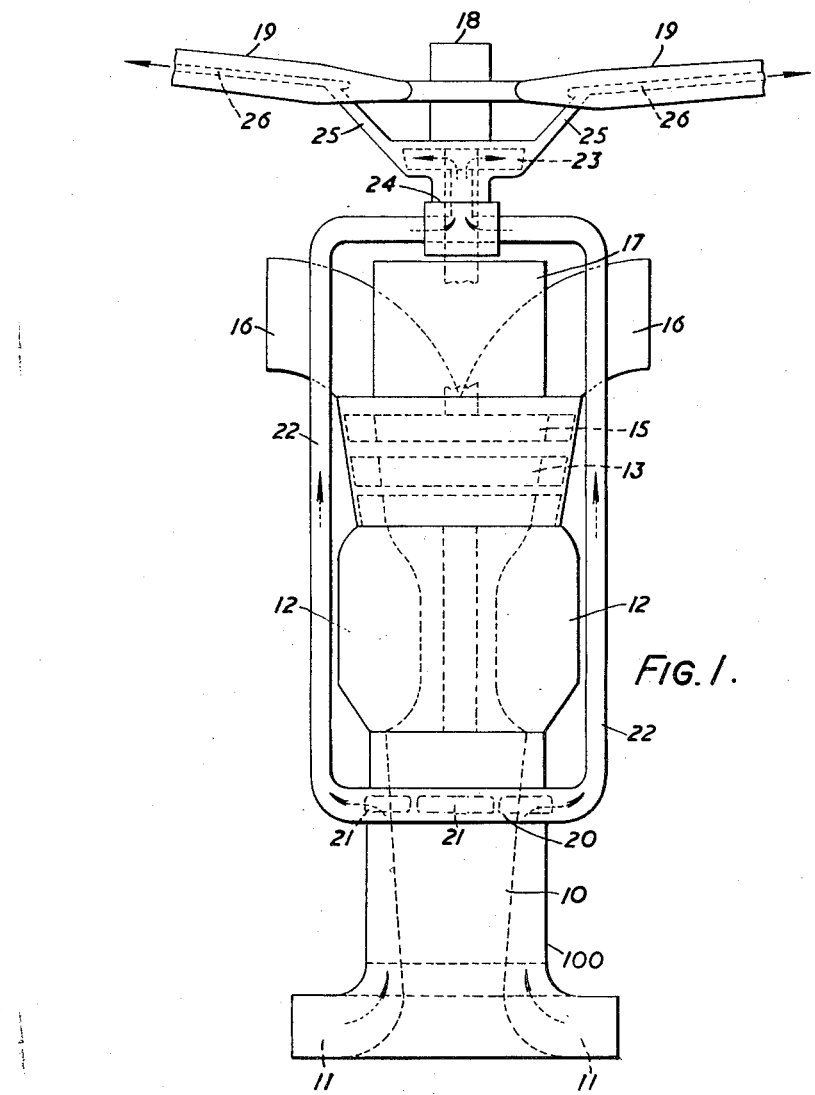
Figure 6:
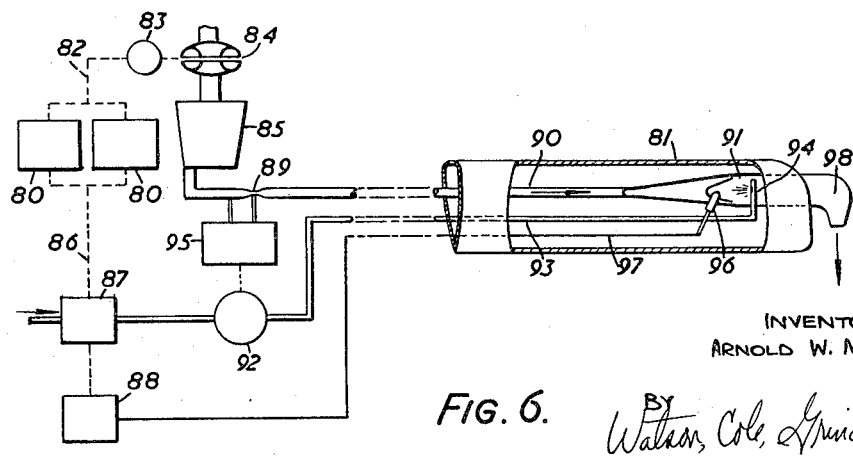
FIGURE 6 shows a control system for a tip-jet combustion system of a helicopter power unit.
Figure 7:
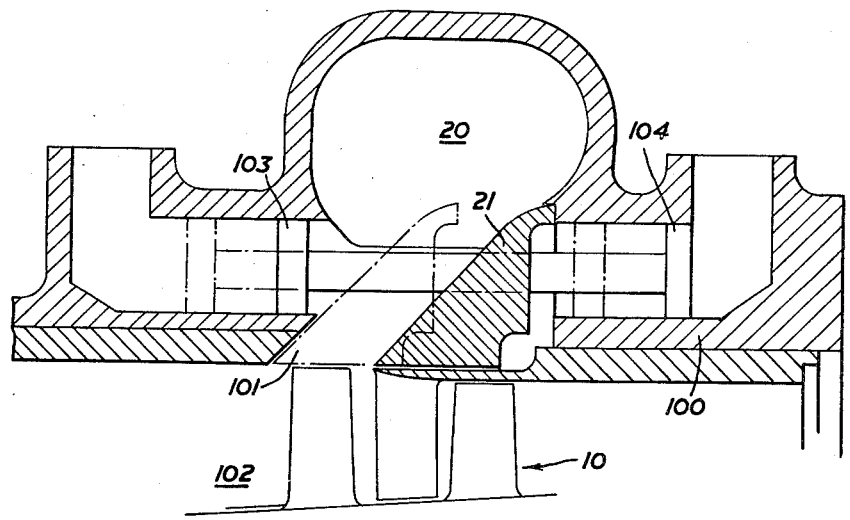
FIGURE 7 shows a detail of the compressor of the power unit of FIGURE 1.

Referring to FIGURE 1, the helicopter power unit illustrated is a vertically mounted gas turbine engine comprising an axial flow compressor 10 which draws in air from the atmosphere through inlets 11, compresses this air and discharges it into combustion chambers 12 in which fuel is burnt. The products of combustion are partially expanded in a two stage compressor-driving turbine 13 which is directly coupled to the compressor 10 through a shaft 14, and are then further expanded in a single stage power turbine 15 and discharged to the atmosphere through exhaust outlets 16. The drive from the power turbine 15 passes through reduction gearing 17 to a rotor head 18, to which are attached helicopter rotor blades 19. At an intermediate position in the length of the compressor 10 there is an annular collector passage 20 which can be shut off from, or placed in communication with, the air passages in the compressor through a plurality of segmental valve members 21. One of said valve members is shown in more detail in FIGURE 7. It is movable axially in the compressor casing 100 between an open position shown in full lines and a closed position shown in broken lines. In the former position it exposes a port 101 in the compressor casing 100 to permit partially compressed air to flow from the compressor air passages 102 into the collector passage 20, while in the latter position it obstructs such flow. The valve members are movable axially by any suitable means such as servo-motor pistons 103, 104. The collector is connected through pipes 22 with compressed air passages 23 in the rotor head 18, the transfer from the stationary pipes 22 to the rotatable head 18 being made through a rotary seal or gland 24. The compressed air passages 23 communicate through branches 25 with air conduits 26 which extend through the blades 19 to nozzles at the blade tips. These nozzles are arranged as shown in FIGURE 6 and will be described in more detail later.

The helicopter power unit shown in FIGURE 1 works as follows. In normal operation the valve members 21 are closed and all the air entering the compressor 10 is compressed, supports combustion of fuel in the combustion chambers 12, and passes through the turbines 13 and 15. The compressor-driving turbine 13 drives the compressor 10, and the power turbine 15 drives the helicopter rotor 18, 19. The power turbine 15 is a free turbine; that is to say, it is not mechanically coupled to the compressor-driving turbine 13. If for any reason considerably more lift is required the valve members 21 are opened. Thus compressed air will pass from the compressor 10 through the pipes 22 and the conduits 26, to be discharged from the tip nozzles of the rotor and assist its rotation. At the same time more fuel is introduced into the combustion chambers 12, to increase the temperature of the combustion products entering the compressor-driving turbine 13. This higher temperature raises the heat drop across the compressor-driving turbine and increases its speed so that more air will be compressed by the compressor 10 to make up for the quantity discharged through the rotor tip nozzles.

Referring now to FIGURE 2, the free power turbines 56, 57 of gas turbine engines 31 and 32 are coupled to a large common spur gear 33 through, respectively, driving shafts 34 and 35, hydraulic couplings 36 and 37, freewheel devices 38 and 39, and small pinions 40 and 41 meshing with the common spur gear 33. The couplings 36 and 37 enable the engines to be coupled to or uncoupled from the common spur gear 33 at will. The free-wheel devices 38 and 39 permit either engine to disconnect itself automatically from the common spur gear should its speed drop below that of the other engine, for instance in the event of a failure. The pinions 40, 41 and the common spur gear 33 provide speed-reducing gearing, the output shaft 42 of the spur gear rotating considerably more slowly than the driving shafts 34 and 35. An extension 43 of the output shaft 42 is coupled to the tail rotor (not shown) of the helicopter. A pinion 44 on the shaft 42 meshes with a larger gear wheel 45 to provide a further speed reduction, the gear wheel 45 being mounted on a shaft 46 coupled to the lifting rotor 58 of the helicopter. An auxiliary compressor 47 has its delivery pipe 48 connected through rotary seal 59 to compressed air conduits in the blades of the lifting rotor. This compressor is coupled through a hydraulic coupling 49 with the pinion 40 associated with engine 31. Should either engine fail, or should greater lifting power be required for any reason, the coupling 49 is filled with hydraulic fluid in the manner customarily employed in disengageable hydraulic couplings so that the auxiliary compressor 47 is driven at engine speed to provide compressed air for the rotor tip jets 60. If engine 32 fails, the auxiliary compressor is driven directly from engine 31, whereas if engine 31 fails, the auxiliary compressor is driven by the engine 32 through the gearing 41, 33, 40.

In the modification shown in FIGURE 3 the auxiliary compressor 50 is driven from the gear wheel 45 through a pinion 51 and a coupling 52. The pinion 51 provides a step-up gear from the relatively slow moving gear wheel 45. Otherwise this arrangement is as shown in FIGURE 2.

Figure 4:
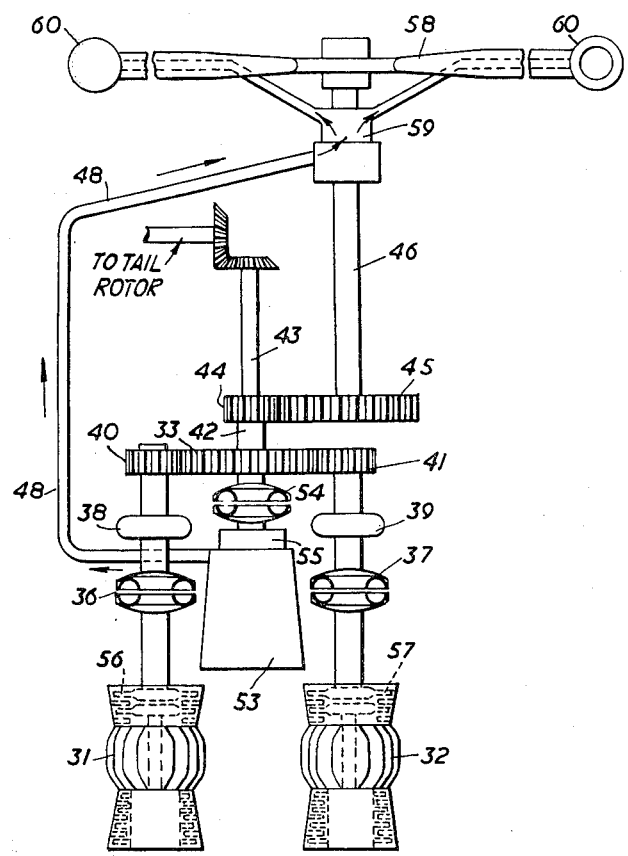

In the modification shown in FIGURE 4 the auxiliary compressor 53 is driven from the spur wheel 33 through a coupling 54 and step-up gearing 55. Otherwise this arrangement is as shown in FIGURE 2.

Figure 5:
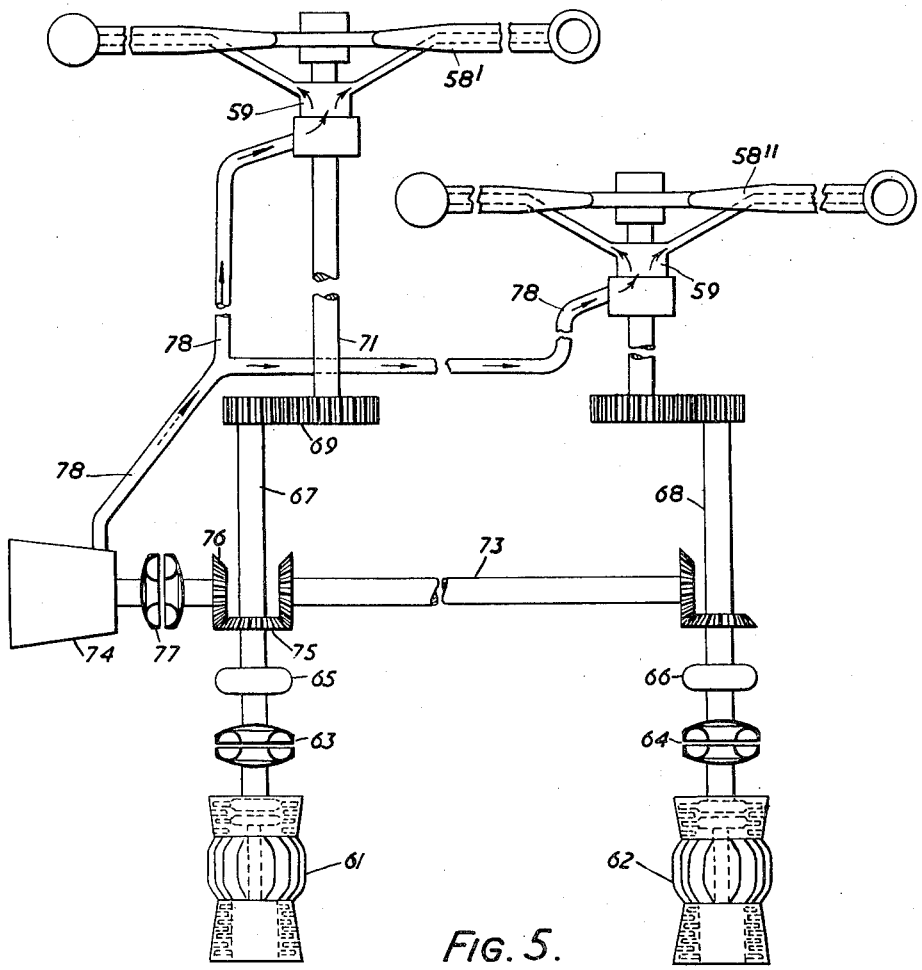
FIGURE 5 shows a multi-engine power unit for a multi-rotor helicopter.

FIGURE 5 shows another multi-engine installation, in which two engines 61 and 62 drive individual lifting rotors through, respectively, hydraulic couplings 63 and 64, free-wheel devices 65 and 66, shafts 67 and 68, reduction gearing 69 and 70, the output shafts 71 and 72. The shafts 67 and 68 are coupled together by bevel gearing and a cross-shaft 73. The auxiliary compressor 74 is driven from the bevel gear 75 on the shaft 67 through a bevel gear 76 and a hydraulic coupling 77. It supplies compressed air when required to at least one of the helicopter rotors 58' and 58 through a pipe 78.

FIGURE 6 shows a schematic control system for a two-engined helicopter power unit in which fuel is burnt in the compressed air supplied to the rotor tip nozzles. In this system torque meters 80 such as that disclosed in United States Patent No. 2,791,655, issued May 7, 1957, to Ronald A. Gilbert are disposed in the mechanical drive from each engine to the helicopter rotor, the tip of one of the blades of which is indicated at 81.

In the event of a fall in torque of either engine to below a predetermined value the corresponding torque meter transmits a signal through a line 82 to a valve 83 which controls the filling of the hydraulic coupling 84 in the drive of the auxiliary compressor 85, to cause this coupling to fill and so transmit a drive to the auxiliary compressor. At the same time the torque meter transmits a signal through a line 86 to start a fuel pump 87 and set in operation a spark igniting device 88. Compressed air from the compressor 85 passes through a venturi 89 and a conduit 90 in the rotor blade 81 to a combustion chamber 91 at the end of the blade. Fuel delivered by the pump 87 passes through a metering valve 92 and a conduit 93 to a burner 94 in the combustion chamber. The flow of fuel is adjusted to suit the mass flow of compressor air by a flow meter 95 which controls the metering valve 92. The igniting device 88 provides a succession of sparks at a sparking plug 96 through a lead 97. The sparks ignite the fuel issuing from the burner 94, which burns continuously in the compressed air to produce hot combustion products which are ejected through a nozzle 98. The nozzle is directed tangentially with respect to the circle described by the tip of the rotating blade 81, and rearwardly with respect to its direction of motion, so that the reaction of the ejected combustion products assists the rotation of the rotor.

What I claim as my invention and desire to secure by Letters Patent is:

1. A helicopter power unit comprising turbine means, air compressor means, a driving connection between said turbine means and said air compressor means, a helicopter rotor having hollow blades and tip jets, output shaft means for driving connection to said rotor, an operative connection between said turbine means and said output shaft means, at least one combustion chamber, passage means from a part of said air compressor means to said combustion chamber, passage means from said combustion chamber to said turbine means, air duct means for connection to said hollow blades of said helicopter rotor, and means for optionally delivering compressed air from another part of said air compressor means to said air duct means by-passing said combustion chamber and turbine means.

2. A helicopter power unit comprising turbine means, an air compressor, a driving connection between said turbine means and said air compressor, a helicopter rotor having hollow blades and tip jets, output shaft means for driving connection to said rotor, an operative connection between said turbine means and said output shaft means, at least one combustion chamber, passage means connecting said air compressor to said combustion chamber, passage means connecting said combustion chamber to said turbine means, a compressed air tapping intermediate between at least a part of said air compressor and said combustion chamber, valve means for opening and closing said tapping, and air duct means for connection to said hollow blades of said helicopter rotor and connected to said tapping.

3. A helicopter power unit comprising air compressor means, a compressor-driving turbine, a driving connection between said compressor-driving turbine and said air compressor means, a power turbine mechanically independent of said compressor-driving turbine, a helicopter rotor having hollow blades and tip jets, output shaft means for driving connection to said rotor, a driving connection between said power turbine and said output shaft means, at least one combustion chamber, passage means from a part of said air compressor means to said combustion chamber, passage means from said combustion chamber to said turbines, air duct means for connection to said hollow blades of said helicopter rotor, and means for optionally delivering compressed air from another part of said air compressor means to said air duct means by-passing said combustion chamber and power turbine.

4. A helicopter power unit comprising an air compressor, a compressor-driving turbine, a driving connection between said compressor-driving turbine and said air compressor, a power turbine mechanically independent of said compressor-driving turbine, output shaft means for connection to a helicopter rotor, said rotor comprising hollow blades and tip jets, a driving connection between said power turbine and said output shaft means, at least one combustion chamber, passage means from said air compressor to said combustion chamber, passage means from said combustion chamber to said turbines, a tapping for compressed air intermediate between at least a part of said air compressor and said combustion chamber, valve means for opening and closing said tapping, and air duct means for connection to said hollow blades of said helicopter rotor and connected to said tapping.

5. A helicopter power unit comprising a gas turbine engine having an air compressor, a compressor-driving turbine, a driving connection between said compressor-driving turbine and said air compressor, and a power turbine mechanically independent of said compressor-driving turbine; a helicopter rotor having hollow blades and tip jets, output shaft means for connection to said rotor, a driving connection between said power turbine of said engine and said output shaft means, an auxiliary air compressor, disengageable coupling means connecting said auxiliary air compressor to said output shaft means, and air duct means for connection to said hollow blades of said helicopter rotor and connected to said auxiliary compressor.

6. A helicopter power unit as defined in claim 5, including a plurality of said engines, said output shaft means comprising a common output shaft for said engines connected to said single helicopter rotor, there being a plurality of said power turbines operatively connected between the respective engines and said output shaft, reduction gearing connecting said input shafts to said common output shaft, a free-wheel device in each said input shaft, an auxiliary compressor, a driving connection connecting said auxiliary compressor to said reduction gearing, a disengageable coupling in said driving connection, and air duct means for connection to said hollow blades of said helicopter rotor and connected to said auxiliary compressor.

7. A helicopter power unit according to claim 6 in which said driving connection connecting said auxiliary compressor to said reduction gearing is coaxial with and directly connected to one of said input shafts.

8. A helicopter power unit according to claim 6 in which said driving connection connecting said auxiliary compressor to said reduction gearing comprises speed-increasing gearing connected to said output shaft of said reduction gearing.

9. A helicopter power unit which comprises a plurality of engines each according to claim 5, output shaft means comprising a plurality of output shafts each for connection to an individual helicopter rotor having hollow blades and tip jets and a plurality of input shafts respectively connected to the power turbines of said engines and to said output shafts, a free-wheel device in each said input shaft, gearing connecting said output shafts and disposed between said free-wheel devices and said helicopter rotors, an auxiliary compressor, a driving connection connecting said auxiliary compressor to said gearing, a disengageable coupling in said driving connection, and air duct means for connection to said hollow blades of said helicopter rotors and connected to said auxiliary compressor.

References Cited in the file of this patent

UNITED STATES PATENTS

| | | |
|---|---|---|
| 2,619,797 | Haworth | Dec. 2, 1952 |
| 2,650,666 | Dorand | Sept. 1, 1953 |
| 2,687,779 | Peterson | Aug. 31, 1954 |
| 2,747,364 | Magin | May 29, 1956 |
| 2,755,866 | Apostolescu | July 24, 1956 |
| 2,831,543 | Matthews | Apr. 22, 1958 |
| 2,865,176 | Skellern | Dec. 23, 1958 |
| 2,941,749 | Sullivan et al. | June 21, 1960 |
| 2,944,609 | Sikorsky | July 12, 1960 |

FOREIGN PATENTS

| | | |
|---|---|---|
| 964,204 | Germany | May 16, 1957 |